United States Patent
Song et al.

(10) Patent No.: US 7,750,888 B2
(45) Date of Patent: Jul. 6, 2010

(54) LIQUID CRYSTAL DISPLAY DEVICE AND DRIVING METHOD THEREOF

(75) Inventors: Sang Moo Song, Daegu (KR); Sang Rae Kim, Pohang-shi (KR); Jae Hong Park, Kyoungsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 734 days.

(21) Appl. No.: 11/785,097

(22) Filed: Apr. 13, 2007

(65) Prior Publication Data

US 2007/0195036 A1   Aug. 23, 2007

Related U.S. Application Data

(62) Division of application No. 10/683,458, filed on Oct. 14, 2003, now Pat. No. 7,224,353.

(30) Foreign Application Priority Data

Oct. 14, 2002   (KR)   ............................... 2002-62429

(51) Int. Cl.
   *G09G 3/36*   (2006.01)
(52) U.S. Cl. .................. 345/103; 345/98; 345/205; 345/211; 349/149; 349/152
(58) Field of Classification Search .................. 345/94, 345/96, 98, 100, 103, 104, 208, 211–214; 349/119, 149–152
   See application file for complete search history.

(56) References Cited

U.S. PATENT DOCUMENTS

| | | | |
|---|---|---|---|
| 5,870,163 A * | 2/1999 | Watanabe et al. ............ 349/149 |
| 6,256,025 B1 | 7/2001 | Imai et al. | |
| 6,476,789 B1 | 11/2002 | Sakaguchi et al. | |
| 6,590,559 B2 | 7/2003 | Takabayashi et al. | |
| 6,697,040 B2 | 2/2004 | Imajo et al. | |
| 6,888,585 B2 | 5/2005 | Kim | |
| 6,894,667 B1 | 5/2005 | Lin | |
| 6,980,185 B2 * | 12/2005 | Kang ........................ 345/87 |
| 6,982,706 B1 | 1/2006 | Doi et al. | |
| 7,038,675 B2 * | 5/2006 | Kawamura et al. .......... 345/211 |
| 2001/0022568 A1 | 9/2001 | Kang | |
| 2002/0012079 A1 | 1/2002 | Kim et al. | |
| 2002/0030658 A1 | 3/2002 | Kim et al. | |
| 2002/0051110 A1 | 5/2002 | Kim | |

\* cited by examiner

*Primary Examiner*—Henry N Tran
(74) *Attorney, Agent, or Firm*—McKenna Long & Aldridge LLP

(57) ABSTRACT

A liquid crystal display and a method of driving the same is capable of for preventing a difference in brightness from occurring between horizontal line blocks. A liquid crystal display includes a liquid crystal display panel having liquid crystal cells arranged in a matrix pattern; at least one integrated circuit for driving the liquid crystal display panel; a supply line commonly connected to the at least one integrated circuit for applying drive signals to the at least one integrated circuit; and a signal-limiting part formed at an input terminal of the supply line, wherein the supply line has a higher resistance than the sum of the line resistances of the entire supply line.

27 Claims, 14 Drawing Sheets

FIG.12A

31 GRAY →
31 GRAY →

| R | G | B | R | G | B | R | G | B | R | G | B |
|---|---|---|---|---|---|---|---|---|---|---|---|
| + | − | + | − | + | − | + | − | + | − | + | − |
| − | + | − | + | − | + | − | + | − | + | − | + |
| + | − | + | − | + | − | + | − | + | − | + | − |
| − | + | − | + | − | + | − | + | − | + | − | + |
| + | − | + | − | + | − | + | − | + | − | + | − |
| − | + | − | + | − | + | − | + | − | + | − | + |
| + | − | + | − | + | − | + | − | + | − | + | − |
| − | + | − | + | − | + | − | + | − | + | − | + |
| + | − | + | − | + | − | + | − | + | − | + | − |
| − | + | − | + | − | + | − | + | − | + | − | + |

31 GRAY →
31 GRAY →

| R | G | B | R | G | B | R | G | B | R | G | B |
|---|---|---|---|---|---|---|---|---|---|---|---|
| − | + | − | + | − | + | − | + | − | + | − | + |
| + | − | + | − | + | − | + | − | + | − | + | − |
| − | + | − | + | − | + | − | + | − | + | − | + |
| + | − | + | − | + | − | + | − | + | − | + | − |
| − | + | − | + | − | + | − | + | − | + | − | + |
| + | − | + | − | + | − | + | − | + | − | + | − |
| − | + | − | + | − | + | − | + | − | + | − | + |
| + | − | + | − | + | − | + | − | + | − | + | − |
| − | + | − | + | − | + | − | + | − | + | − | + |
| + | − | + | − | + | − | + | − | + | − | + | − |

~241

LIQUID CRYSTAL DISPLAY DEVICE AND DRIVING METHOD THEREOF

This application is a Divisional of prior application Ser. No. 10/683,458, filed Oct. 14, 2003, now U.S. Pat. No. 7,224,353 which claims the benefit of Korean Patent Application No. 2002-0062429 filed in Korea on Oct. 14, 2002, which is hereby incorporated by reference in its entirety as if fully set forth herein.

BACKGROUND OF THE INVENTION

1. Field of the Invention

The present invention relates to liquid crystal displays, and more particularly to liquid crystal displays capable of preventing a difference in brightness from being generated between horizontal line blocks and a driving method thereof.

2. Description of the Related Art

Generally, liquid crystal displays (LCDs) control light transmittance characteristics liquid crystal material using electric fields to display pictures. Accordingly, LCDs typically include a LCD panel having a plurality of liquid crystal cells arranged in a matrix pattern and a drive circuit for driving the LCD panel.

The LCD panel includes a plurality of gate lines and a plurality of data lines arranged so as to cross one another, wherein the liquid crystal cells are defined by crossings of the gate and data lines. The liquid crystal display panel is further provided with a common electrode and a plurality of pixel electrodes for applying the electric fields to the plurality of liquid crystal cells. Each pixel electrode is connected to a respective data line via source and drain terminals of a switching device such as a thin film transistor (TFT). Gate terminals of the TFTs are connected to respective gate lines, allowing pixel voltage signals to be applied to lines of pixel electrodes.

The drive circuit includes a gate driver for driving the plurality of gate lines, a data driver driving the plurality of data lines, a timing controller for controlling the gate and data drivers, and a power supply for applying various drive voltages used by the LCD. The timing controller controls the drive timing of the gate and data divers while simultaneously applying a pixel data signal to the data driver. The power supply generates drive voltages such as a common voltage VCOM, a gate high voltage VGH, a gate low voltage VGL, etc., required by the LCD. The gate driver sequentially applies scan signals to the plurality of gate lines to sequentially drive the plurality of liquid crystal cells one line at a time. The data driver applies pixel voltage signals to the plurality of data lines whenever scan signals are applied to any one of the plurality of gate lines. Accordingly, the LCD controls the light transmittance characteristics of liquid crystal material by applying the electric field between the plurality of pixel electrodes and the common electrode in accordance with pixel voltage signals applied to the plurality of liquid crystal cells to display a picture.

The data and gate drivers include a plurality of integrated circuits (ICs) directly connected to the LCD panel. The data driver IC and the gate diver IC are either mounted onto a tape carrier package (TCP), capable of being connected to the LCD panel in a tape automated bonding (TAB) method, or are mounted directly onto the LCD panel in a chip-on-glass (COG) method.

Driver ICs, mounted to their respective TCPs and connected to the LCD panel via the TAB method, are connected to each other and receive external control signals and drive voltages via signal lines formed on a printed-circuit-board (PCB) connected to the TCP. Specifically, the data driver ICs are connected in parallel via signal lines formed on a data PCB. Accordingly, the data driver ICs commonly receive control signals and pixel data signals from the timing controller and receive drive voltages from the power supply. The gate driver ICs are connected in series via signal lines formed on a gate PCB. Accordingly, the gate driver ICs receive control signals from the timing controller and receive drive voltages from the power supply.

The driver ICs mounted directly to the LCD panel via the COG method are connected to one another via a line-on-glass (LOG) method where signal lines are mounted directly onto the LCD panel. Specifically, the signal lines are mounted directly onto a lower glass substrate of the LCD panel. Accordingly, the LOG signal lines receive control signals from the timing controller and receive drive voltages from the power supply.

Even when the aforementioned driver ICs are connected to the LCD panel via the TAB method, the LCD can be made thinner by eliminating the PCB and by adopting the LOG method. For example, gate driver ICs typically require a relatively small amount of signal lines. Accordingly, signal lines connected to the gate driver ICs, previously provided via the TAB method, are formed directly on the LCD panel and are connected in series to each other via the LOG method. As a result, the necessity of the gate PCB is eliminated, the gate driver ICs are connected in series via signal lines mounted directly on the lower glass substrate of the LCD panel, and the gate driver ICs commonly receive control signals and drive voltages (hereinafter referred to collectively as gate drive signals).

FIG. 1 illustrates a plan view of a line-on-glass (LOG) liquid crystal display (LCD) according to the related art.

Referring to FIG. 1, a related art LCD employing the use of LOG signal lines instead of a gate PCB, generally includes an LCD panel 1, a data PCB 12, a plurality of data TCPs 8 connected between a first side of the LCD panel 1 and the data PCB 12, a plurality of data driver ICs 10 mounted on respective ones of the data TCPs 8, a plurality of gate TCPs 14 connected to a second side of the LCD panel 1, and a plurality of gate driver ICs 16 mounted on respective ones of the gate TCPs 14.

The LCD panel 1 generally includes a lower substrate 2 supporting a thin film transistor (TFT) array and various signal lines including gate lines 20 and data lines 18, an upper substrate 4 supporting a color filter array. Liquid crystal material is injected between the lower substrate 2 and the upper substrate 4. As mentioned above, the LCD panel 1 includes a plurality of liquid crystal cells arranged in a matrix pattern and provided at crossings of the gate and data lines 20 and 18 to collectively form a picture display area 21. In an outer area of the lower substrate 2, located outside the picture display area 21, data pads are formed to extend from the plurality of data lines 18 and gate pads are formed to extend from the plurality of gate lines 20. Further, an LOG signal line group 26 may be formed within the outer area of the lower substrate 2 for transmitting gate drive signals to the gate driver ICs 16.

The data driver ICs 10 are mounted onto respective ones of the data TCPs 8 having input pads 24 and output pads 25 for electrically connecting to the data driver ICs 10. The input pads 24 of the data TCP 8 are electrically connected to output pads of the data PCB 12 while the output pads 25 are electrically connected to the data pads formed within the outer area of the lower substrate 2. A first data TCP 8 supports a gate drive signal transmission group 22, formed to electrically connect to an LOG signal line group 26 mounted onto the lower substrate 2. The gate drive signal transmission group 22 applies gate drive signals to the LOG signal line group 26 outputted by the timing controller and the power supply via the data PCB 12.

The data driver ICs 10 convert digital pixel data signals into analog pixel voltage signals and applies the analog pixel voltage signals to the plurality of data lines 18 in the LCD panel 1.

The gate driver ICs 16 are mounted onto respective ones of the gate TCPs 14 supporting a gate drive signal transmission line group 28 and output pads 30 for electrically connecting to the gate driver ICs 16. The gate drive signal transmission line group 28 is electrically connected to the LOG signal line group 26 on the lower substrate 2 and the output pads 30 are electrically connected to the gate pads formed within the outer area of the lower substrate 2.

The gate driver ICs 16 sequentially apply scan signals, such as a gate high voltage (VGH) signal, to the plurality of gate lines 20 in response to the output control signals. Further, the gate driver ICs 16 apply a gate low voltage (VGL) signal to the gate lines during the remainder of a horizontal period, excluding a period during which the VGH signal is applied.

The LOG type signal line group 26 generally consists of signal lines capable of transmitting drive voltages supplied from the power supply (e.g., a high logic voltage of the gate signal (gate high voltage) VGH, a low logic voltage of the gate signal (gate low voltage) VGL, a common voltage VCOM, a ground voltage GND and a power supply voltage VCC, etc.) and gate control signals supplied from the timing controller (e.g., a gate start pulse GSP, a gate shift clock signal GSC, a gate enable signal GOE, etc.).

Signal lines in the LOG signal line group 26 are formed in parallel in a fine pattern and occupies a relatively small amount of space (e.g., in a pad area arranged within the outer area of the lower substrate 2). Further, the LOG signal line group 26 is formed simultaneously with, and out of the same material as, a gate metal layer forming the plurality of gate lines 20. The gate metal layer typically includes a metal having a relatively high resistivity constant coefficient (0.046) such as AlNd. Accordingly, a resistance value of the LOG signal line group 26 is generally greater than a resistance value of the signal lines formed of thin copper in gate PCBs. Further, the resistance value of the LOG signal line group 26 is proportional to the length of the signal lines within the LOG signal line group 26. Accordingly, as the distance from the data PCB 12 increases, the resistance of the signal line increases to the point that the gate drive signals become undesirably distorted. As the gate drive signals become distorted, the picture quality displayed within the picture display area 21 becomes deteriorated as well.

FIG. 2 illustrates a difference in brightness between horizontal line blocks caused by a line resistor of the LOG signal group shown in FIG. 1.

Referring to FIG. 2, within the related art LCD, each of the LOG signal lines within the LOG signal line group 26 transmits gate high and low voltages VGH and VGL, respectively, and consists of first to third LOG type signal lines LVG1 to LVG3 each connected between a first data TCP 8 and a first to a third gate TCP 14A to 14C. The first to third LOG type signal lines LVG1 to LVG3 each have inherent line resistances a, b, c, respectively, proportional to their lengths and are connected to each other in series via the first to third gate TCPs 14A to 14C.

Accordingly, the first gate driver IC 16, mounted onto the first gate TCP 14A, is supplied with a first gate voltage VG1, including the gate high voltage VGH and the gate low voltage VGL, that is reduced in an amount proportional to the first line resistance (a) of the first LOG type signal line LVG1. The first gate voltage VG1 is applied to the gate lines of the first horizontal line block (A) via the first gate driver IC 16.

The second gate drive IC 16, mounted onto the second gate TCP 14B, is supplied with a second gate voltage VG2, including the gate high voltage VGH and the gate low voltage VGL, that is reduced in an amount proportional to the sum of the first and second line resistances (a+b) of the first LOG type signal line LVG1 and the second LOG type signal line LVG2, connected in series. The second gate voltage VG2 is applied to the gate lines of the second horizontal line block (B) via the second gate drive IC 16.

The third gate driver IC 16, mounted onto the third gate TCP 14C, is supplied with a third gate voltage VG3, including the gate high voltage VGH and the gate low voltage VGL, that is reduced in an amount proportional to the sum of the first, second, and third line resistances (a+b+c) of the first to third LOG type signal lines LVG1 to LVG3, connected in series. The third gate voltage VG3 is applied to the gate lines of the third horizontal line block (C) via the third gate driver IC 16.

Since differences between the gate voltages VG1 to VG3 exist, differences in brightness between the first to third horizontal line blocks A to C connected to one of the first to third gate driver ICs 16 also exist, which are manifested as a horizontal line 6. This causes the picture display area 21 to appear divided, thereby deteriorating a picture quality of the LCD. Progressing from the first gate driver IC to the third gate driver IC, the line resistances (a, b, c) of the LOG type signal line LVG add to one another. Accordingly, the first gate voltage VG1 is greater than the second gate voltage VG2, and the second gate voltage VG2 is greater than the third gate voltage VG3.

While the difference in gate voltages applied by the gate driver ICs 16 can be compensated for by independently connecting the plurality of LOG type gate voltage transmission lines to corresponding gate driver ICs 16 and by decreasing the cross section of the lines in proportion to the length of the transmission line, the outer area of the lower substrate 2, where the LOG type signal line group 26 is formed, is limited. Accordingly, it becomes not only difficult to provide a plurality of LOG type signal lines, but there is a physical limit as to how large the cross section of a transmission line can be initially formed.

Accordingly, the compensation of gate voltage differences using line resistors, without changing the design of the LOG type signal line group 26 formed within the limited space, has been proposed in accordance with the principles of the present invention.

SUMMARY OF THE INVENTION

Accordingly, the present invention is directed to a liquid crystal display panel that substantially obviates one or more of the problems due to limitations and disadvantages of the related art.

An advantage of the present invention provides a liquid crystal display capable of preventing a difference in brightness from being generated between horizontal line blocks and a driving method thereof.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device comprises a liquid crystal display panel including a plurality of liquid crystal cells arranged in a matrix pattern; at least two integrated circuits including first and second integrated circuits for driving the liquid crystal display panel; a supply line connected to the first and second integrated circuits for applying a drive signal to the first and second integrated circuits; and a signal-limiting element on the supply line positioned before the supply line connects to the first integrated circuit and having a resistance greater than or equal to a line resistance of a segment of the supply line extending after the signal-limiting element.

In another aspect of the present invention, a method of manufacturing a liquid crystal display device comprises forming a liquid crystal display panel including a plurality of liquid crystal cells arranged in a matrix pattern; providing at least two integrated circuits including first and second integrated circuits for driving the liquid crystal display panel; forming a supply line connected to the at least two integrated circuits for applying a drive signal to the at least two integrated circuit, the supply line having a signal-limiting element on the supply line positioned before the supply line connects to the first integrated circuit and having a resistance greater than or equal to a line resistance of a part of the supply line extending after the signal-limiting element.

In another aspect of the present invention, a driving method of a liquid crystal display device comprises limiting a current component of a drive signal applied to at least two integrated circuits including first and second integrated circuits through a supply line connected to the at least two integrated circuits for applying a drive signal to the at least two integrated circuits, the supply line having a signal-limiting element on the supply line positioned before the supply line connects to the first integrated circuit and having a resistance greater than or equal to a line resistance of a part of the supply line extending after the signal-limiting element; and driving a liquid crystal display panel via the drive signal applied to the at least two integrated circuits.

In another aspect of the present invention, a liquid crystal display device comprises a liquid crystal display panel including a transparent substrate; first and second tape carrier packages adjacent one side of the transparent substrate; first and second gate driver circuits on the first and second tape carrier packages, respectively, for driving the display panel; a printed circuit board; a signal line for transmitting a drive signal from the printed circuit board to the first and second gate driver circuits, the first gate driver circuit corresponding to a first block of a display area and the second gate driver circuit corresponding to a second block of the display area, the signal line having a segment between the first and second gate driver circuits, the segment being on the transparent substrate and having a predetermined line resistance; and at least one current-limiting element located on the signal line before the signal line becomes connected to the first gate driver circuit for limiting a current of the drive signal, wherein a resistance of the at least one current-limiting element is greater than or equal to the predetermined line resistance.

In another aspect of the present invention, a display device comprises a display panel including a substrate; first and second integrated circuits for driving the display panel; a printed circuit board; at least one signal line for transmitting a drive signal from the printed circuit board to the first and second integrated circuits, the first integrated circuit corresponding to a first block of a display area and the second integrate circuit corresponding to a second block of the display area, the signal line having a portion between the first and second integrated circuits, the portion of the signal line having a predetermined line resistance; and at least one current-limiting element located on the signal line for limiting a current of the drive signal, wherein a resistance of the at least one current-limiting element is greater than or equal to the predetermined line resistance.

In another aspect of the present invention, a liquid crystal display (LCD) includes an LCD panel having liquid crystal cells arranged in a matrix pattern; at least one integrated circuit (IC) for driving the LCD panel; a supply line commonly connected to the at least one IC for applying drive signals to the at least one IC; and a signal-limiting part formed at an input terminal of the supply line, wherein the signal-limiting part has a higher resistance than a sum of the resistances of line resistors of the supply line.

In another aspect of the present invention, a liquid crystal display (LCD) device includes an LCD panel having liquid crystal cells arranged in a matrix pattern; at least one IC for driving the LCD panel; a supply line commonly connected to the at least one integrated circuit for applying drive signals to the at least one IC; and a current-limiting device for limiting a current component of the drive signals applied from the supply line to the at least one IC.

In still another aspect of the present invention, an LCD device includes an LCD panel having liquid crystal cells arranged in a matrix pattern; at least one IC for driving the LCD panel; a line-on-glass (LOG) signal line formed on the LCD panel via a LOG method for transmitting drive signals to the at least one IC; a signal transmission line for applying the drive signals to the LOG signal line; and a current-limiting device for limiting a current component of the drive signals applied to the at least one IC from at least one of the signal transmission line or the LOG signal line.

In a further aspect of the present invention, a driving method of an LCD includes limiting a current component of a drive signal applied to at least one IC via a current-limiting device to apply the drive signal to the at least one IC; and driving a LCD panel using the drive signal applied to the IC.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 12A and 12B illustrate diagrams of test patterns using a 31 gray scale value and a 31 gray scale value by odd-numbered and even-numbered frames, respectively;

DETAILED DESCRIPTION OF THE ILLUSTRATED EMBODIMENTS

Reference will now be made in detail to embodiments of the present invention, examples of which are illustrated in the accompanying drawings.

Figure 1:
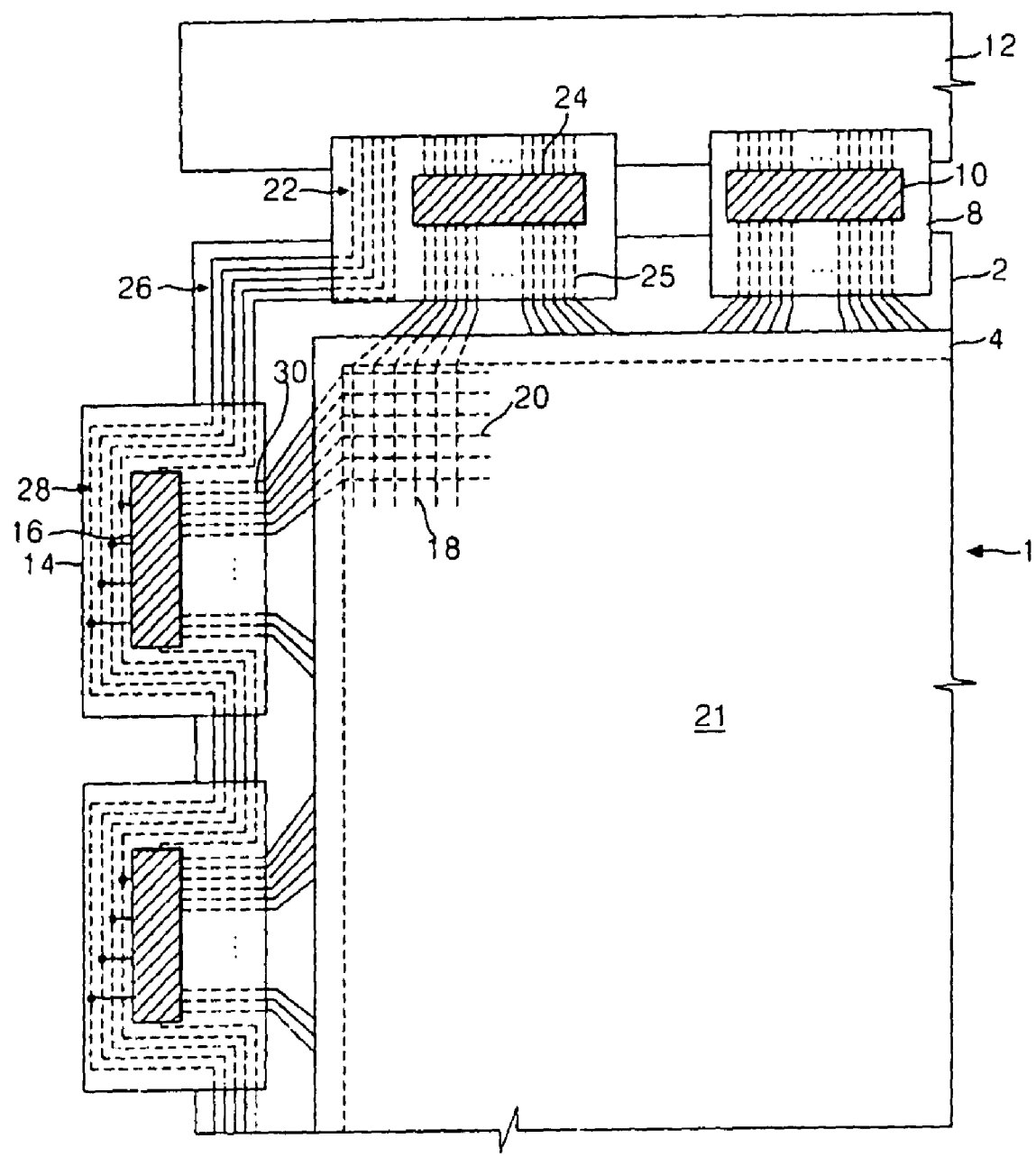
FIG. 1 illustrates a plan view of a line-on-glass (LOG) liquid crystal display (LCD) according to the related art.
Figure 2:
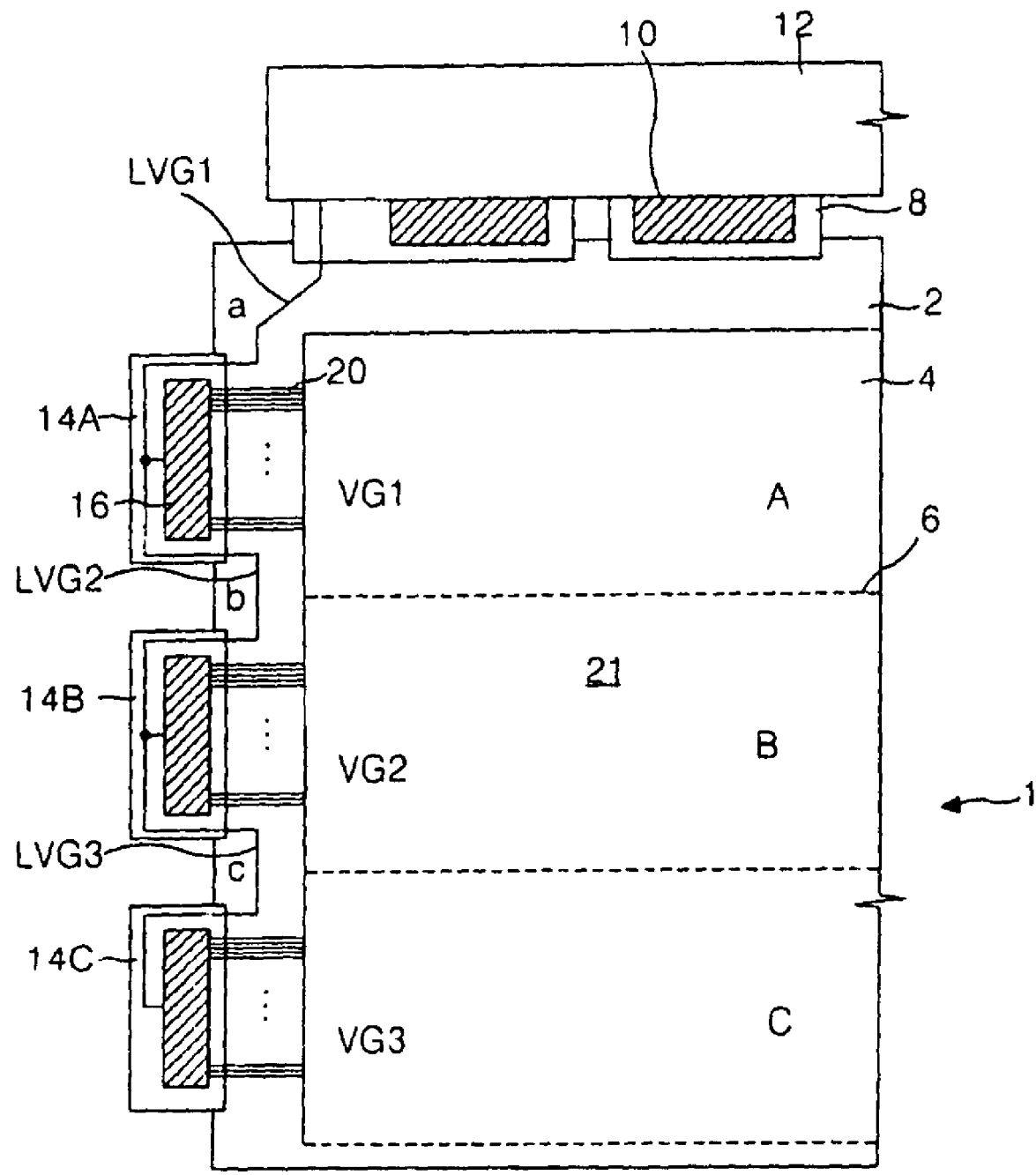
FIG. 2 illustrates a difference in brightness between horizontal line blocks caused by a line resistance of the LOG signal group shown in FIG. 1.
Figure 3:
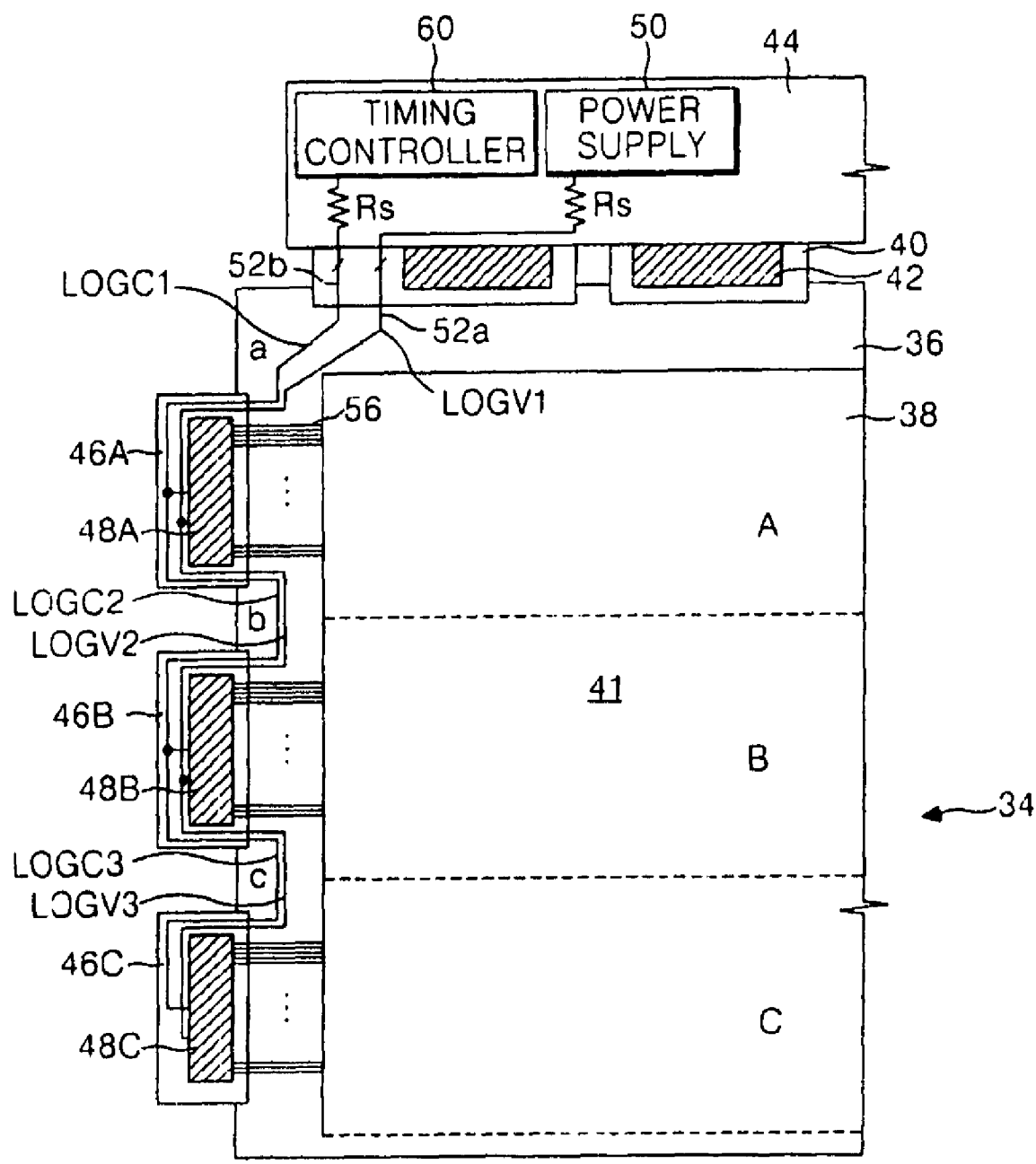
FIG. 3 illustrates a plan view of an LOG LCD according to a first aspect of the present invention.

FIG. 3 illustrates a plan view of an LOG LCD according to a first aspect of the present invention.

Referring to FIG. 3, the liquid crystal display (LCD) according to the first aspect of the present invention may, for example, include an LCD panel 34; a plurality of data TCPs 40 connected between a first side of the LCD panel 34 and a data PCB 44; first to third gate TCPs 46A to 46C, respectively, connected to a second side of the LCD panel 34; a plurality of data driver ICs 42 mounted onto respective ones of the TCPs 40; first to third gate driver ICs 48A to 48C, respectively, mounted onto respective ones of the first to third gate TCPs 46A to 46C; a power supply 50 for generating drive voltages and for applying the generated drive voltage to the gate driver ICs 48 and the data driver ICs 42, and a timing controller 60 for controlling the gate driver ICs 48 and the data driver ICs 42.

In one aspect of the present invention, the LCD panel 34 may, for example, include a lower substrate 36 for supporting a thin film transistor (TFT) array and various signal lines such as a plurality of gate lines 56 and a plurality of data lines (not shown), an upper substrate 38 for supporting a color filter array, and liquid crystal injected between the upper substrate 38 and the lower substrate 36. The LCD panel 34 may further include a plurality of liquid crystal cells defined by crossings of the gate and data lines to collectively form a picture display area 41. In an outer area of the lower substrate 36, located outside of the picture display area 41, data pads may be formed to extend from the plurality of data lines (not shown) and gate pads may be formed to extend from the plurality of gate lines 56. Further, an LOG signal line group including the LOG voltage lines LOGC and LOGV may be formed within the outer area of the lower substrate 36 for transmitting the gate drive signals applied to the first to third gate driver ICs 48A to 48C The data driver ICs 42 may be mounted onto respective ones of the data TCPs 40 capable of electrically connecting output pads of a data PCB 44 to data pads of the lower substrate 36 via input/output pads of the data driver ICs 42. A first data TCP 40 may further support a gate drive signal transmission line group 52A and 52B, formed to electrically connect to the LOG voltage lines LOGC and LOGV on the lower substrate 36. In one aspect of the present invention, the gate drive signal transmission line group 52A and 52B may apply the gate drive signals from the power supply 50 and the timing controller 60 to the LOG voltage line LOGC and LOGV via the data PCB 44. The data driver ICs 42 may convert digital pixel data signals into analog pixel voltage signals and applies the analog pixel voltage signals to the plurality of data lines in LCD panel 34.

According to the principles of the present invention, the timing controller 60 may, for example, control the drive timing of the gate driver ICs 48 and data driver ICs 42 and may apply pixel data signals to the data driver ICs 42.

According to the principles of the invention, the power supply 50 may, for example, generate drive voltages such as a common voltage VCOM, a gate high voltage VGH and a gate low voltage VGL, etc., which are required by the LCD panel.

The first to third gate driver ICs 48A to 48C may be mounted onto respective ones of the first to third gate TCPs 46A to 46C, respectively, wherein the first to third gate TCPs 46A to 46C may be connected to the gate pads of the lower substrate 36 via output pads connected with the first to third gate driver ICs 48A to 48C.

The gate driver ICs 48A to 48C may sequentially apply a scan signal, such as a gate high voltage (VGH) signal, to the plurality of gate lines 56 in response to the output control signals. Further, the gate driver ICs 48A to 48C may apply the gate low voltage (VGL) signal to the plurality of gate lines 56 during the remainder of a horizontal period, excluding a period during which the VGH signal is applied.

In accordance with the principles of the present invention, the LOG voltage lines LOGC and LOGV of the LOG signal line group, for example, may be provided for applying drive voltages from the power supply 50 (e.g., a high logic voltage of the gate signal (gate high voltage) VGH, a low logic voltage of the gate signal (gate low voltage) VGL, a common voltage VCOM, a ground voltage GND and a power supply voltage VCC, etc.) and gate control signals supplied from the timing controller (e.g., a gate start pulse GSP, a gate shift clock signal GSC, a gate enable signal GOE, etc.). The LOG voltage lines LOGC and LOGV may be formed simultaneously with, and out of the same material as, a gate metal layer forming the plurality of gate lines 56.

In one aspect of the present invention, a limiting resistor Rs having a relatively high resistance may be provided at the input terminal of the LOG voltage lines LOGC and LOGV. This limiting resistor Rs causes the first to third line resistances (a, b, c) inherent to the LOG voltage lines LOGC and LOGV to be negligible and prevents differences in voltage of the gate drive signal from being generated between the gate driver ICs 48 caused by the first to third line resistances.

According to the principles of the present invention, the limiting resistor Rs may be connected in series to gate drive signal lines 52A and 52B located in the data PCB 44. In another aspect of the present invention, the limiting resistor Rs may be connected in series to the gate drive signal lines 52A and 52B located in the data TCP 40. In yet another aspect of the present invention, the limiting resistor Rs may be connected in series to, and formed integrally with, the gate drive signal output terminal of the timing controller 60. In still another aspect of the present invention, the limiting resistor Rs may be connected in series to, and formed integrally with, the gate drive signal output terminal of the power supply 50. Alternatively, and as shown in FIG. 4, the limiting resistor Rs may be connected in series to the input terminal of the LOG voltage lines LOGC and LOGV of the LCD panel 34 (i.e., the first LOG voltage lines LOGC1 and LOGV1).

Figure 4:
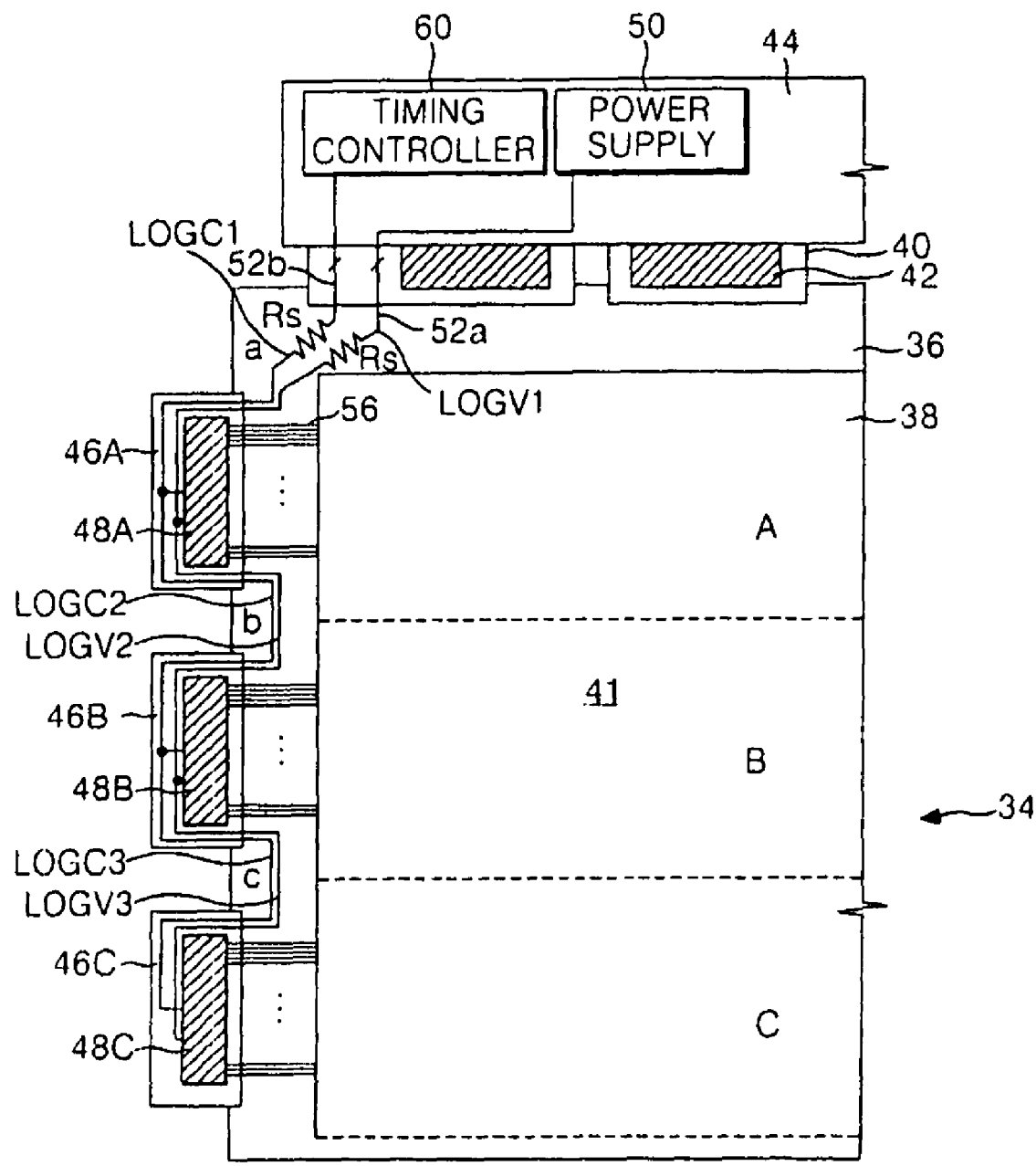
FIG. 4 illustrates a plan view of the LOG LCD where a limiting resistor shown in FIG. 3 is formed on a lower substrate of a LCD panel.
Figure 5:
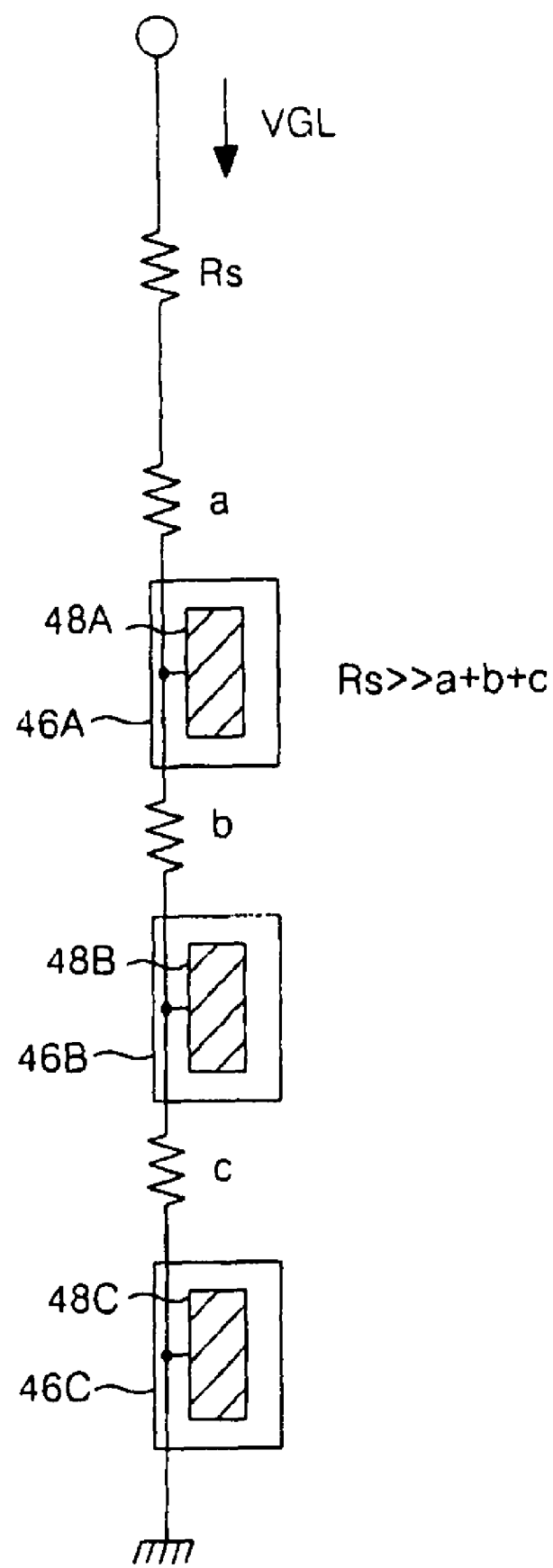
FIG. 5 illustrates a connection between LOG voltage lines having predetermined line resistances and the limiting resistor shown in FIGS. 3 and 4.

FIG. 5 illustrates a connection between LOG voltage lines having predetermined line resistances and the limiting resistor shown in FIGS. 3 and 4.

Referring to FIG. 5, the limiting resistor Rs may be connected in series with the first to third LOG voltage lines formed between the gate TCP's 46A, 46B, 46C wherein the first to third LOG voltage lines have the first to third line resistances (a, b, c), respectively. In one aspect of the present invention, the limiting resistor Rs may have a resistance value equal to or greater than the sum of the first to third line resistances (a+b+c) of the entire LOG voltage line. In another aspect of the present invention, the limiting resistor Rs may have a resistance value much greater than the sum of the first to third line resistances (a+b+c) of the entire LOG voltage line (Rs>>a+b+c). In yet another aspect of the present invention, the limiting resistor Rs may have a resistance of about 270Ω to about 830Ω.

According to the principles of the present invention, the limiting resistor Rs may limit the amount of current, I, of the gate drive signal. Thus, the amount of current, I, applied to each of the first to third gate driver IC 48A to 48C via the LOG voltage lines LOGC and LOGV, connected in series, is limited as in FORMULA 2.

$$I = V_{Rs} Rs = V_a/a = V_b/b = V_c/c$$

$$V_{Rs} >> V_a, V_b, V_c,$$ [FORMULA 2]

Accordingly, limiting the current decreases the influence of the first to third line resistances (a, b, c) of the LOG voltage lines LOGC and LOGV on voltage components (Va, Vb, Vc) of the gate drive signals applied by the first to third gate driver ICs 48A to 48C. In one aspect of the present invention, limiting the current may cause the influence of the first to third line resistances to be substantially negligible. Accordingly, the first to third gate driver ICs 48A to 48C may be supplied with gate drive signals having substantially equal voltage components Va, Vb, Vc as shown in FORMULA 3.

$$V_a \approx V_b \approx V_c$$ [FORMULA 3]

According to the principles of present invention, the limiting resistor Rs, formed at the gate drive signal input terminal of the first gate driver IC 48A, may cause the line resistance of the LOG voltage lines LOGC and LOGV to decrease to the point it becomes substantially negligible. Thus, the line resistance at the input terminals of each of the gate driver ICs 48A, 48B and 48C may be substantially the same. Consequently, substantially the same gate drive signal may be applied to the gate line 56 through each gate driver IC 48A, 48B and 48C and the difference in brightness between horizontal line blocks (A, B, C) can be prevented.

Figure 6:
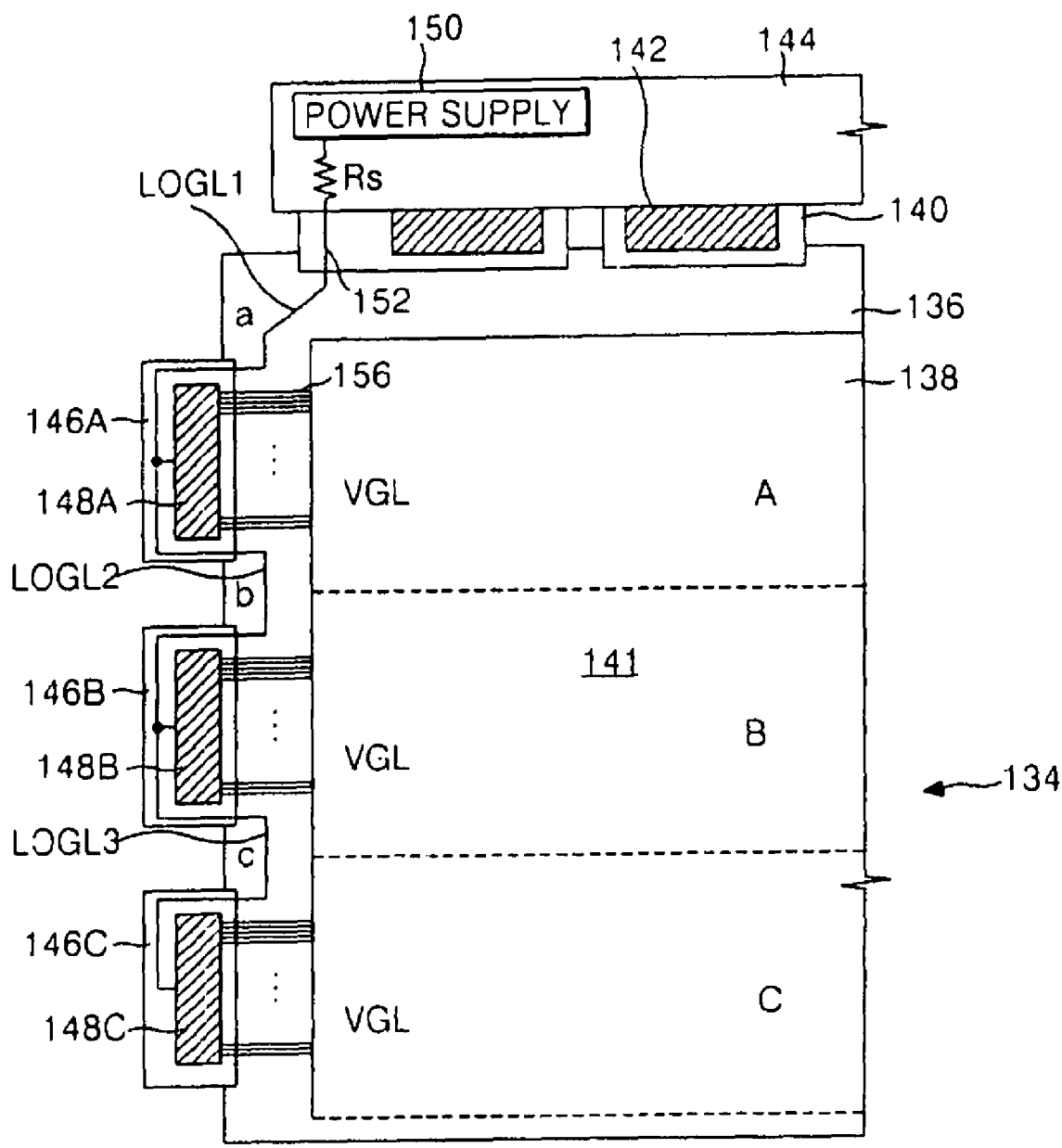
FIG. 6 illustrates a plan view of an LOG LCD according to a second aspect of the present invention.

FIG. 6 illustrates a plan view of an LOG LCD according to a second aspect of the present invention.

Referring to FIG. 6, a liquid crystal display device according to a second aspect of the present invention may, for example, include a limiting resistor installed on an LOG voltage line LOGL provided for transmitting a gate low voltage or at an input terminal of a gate drive signal line group.

The LCD according to the second aspect of the present invention may, for example, include an LCD panel 134; a plurality of data TCPs 140 connected between a first side of the LCD panel 134 and a data PCB 144; first to third gate TCPs 146A to 146C, respectively, connected to a second side of the LCD panel 134; a plurality of data driver ICs 142 mounted onto respective ones of the data TCPs 140; first to third gate driver ICs 148A to 148C, respectively, mounted onto respective ones of gate TCPs 146A to 146C; a power supply 150 for generating drive voltage signals capable of being applied to the gate driver ICs 148 and the data driver ICs 142, and a limiting resistor Rs connected in series with the power supply 150.

The LCD panel 134 may, for example, include a lower substrate 136 for supporting a thin film transistor (TFT) array and various signal lines such as a plurality of gate lines 156 and a plurality of data lines (not shown); an upper substrate 138 for supporting a color filter array; and liquid crystal between the upper substrate 138 and the lower substrate 136. The LCD panel 134 may further include a plurality of liquid crystal cells defined by crossings of the gate and data lines to collectively form a picture display area 141. In an outer area of the lower substrate 136, located outside of the picture display area 141, an LOG signal line group may be formed for transmitting gate drive signals applied to the first to third gate driver ICs 148A to 148C.

The data driver ICs 142 may be mounted onto respective ones of the data TCPs 140 connected to a data PCB 144 and the lower substrate 136. A first data TCP 140 may further support a gate drive signal line group 152 connected to each of the LOG signal line groups on the lower substrate 136. The gate drive signal line group 152 may apply the gate drive signals from the power supply 150 through the data PCB 144 to the LOG signal line groups. The data driver ICs 142 may convert digital pixel data signals into a analog pixel voltage signals and apply the analog pixel voltage signals to the plurality of data lines in the LCD panel 134.

According to the principles of the present invention, the power supply 150 may, for example, generate drive voltages such as a common voltage VCOM, a gate high voltage VGH and a gate low voltage VGL, etc., which are required by the LCD panel.

The first to third gate driver ICs 148A to 148C may be mounted onto respective ones of the gate TCPs 146, wherein the first to third gate TCPs 146A to 146C may be connected to the lower substrate 136 via output pads connected with the gate driver ICs 148.

The gate drive ICs 148A to 148C may sequentially apply a scan signal, such as a gate high voltage (VGH) signal, to the plurality of gate lines 56 in response to the output control signals. Further, the gate driver ICs 148A to 148C may apply the gate low voltage (VGL) signal to the plurality of gate lines 156 during the remainder of a horizontal period, excluding a period during which the VGH signal is applied.

In accordance with the principles of the present invention, the LOG signal line group may, for example, include an LOG voltage line and an LOG control line for applying drive voltages outputted from the power supply 150 (e.g., a high logic voltage of the gate signal (gate high voltage) VGH, a low logic voltage of the gate signal (gate low voltage) VGL, a common voltage VCOM, a ground voltage GND and a power supply voltage VCC, etc.) and gate control signals outputted from the timing controller (e.g., a gate start pulse GSP, a gate shift clock signal GSC, a gate enable signal GOE, etc.). The LOG signal line group may be formed simultaneously with, and out of the same material as, a gate metal layer forming the plurality of gate lines 156.

In one aspect of the present invention, the LOG signal line group may include an LOG voltage line LOGL capable of transmitting the gate low voltage VGL. Further, a limiting resistor Rs having a relatively high resistance may be provided at the input terminal of the LOG voltage line LOGL to positively influence the picture quality of the LCD. Alternatively, the limiting resistor Rs may be provided at the input terminal of the gate drive signal line group 152 that applies the gate low voltage VGL generated by the power supply 150 to the LOG voltage line LOGL.

Accordingly, the limiting resistor Rs may be connected in series with first to third LOG voltage lines LOGL1 to LOGL3 formed between the gate TCPs 146A, 146B and 146C. Further, the limiting resistor Rs has a relatively high resistance compared to the sum of the first to third line resistances (a+b+c) of the first to third LOG voltage lines LOGL1 to LOGL3. Therefore, the limiting resistor Rs causes the first to third line resistances (a, b, c) inherent to the LOG voltage line LOGL to be negligible and prevents differences in voltage of the gate drive signal from being generated between the gate driver ICs 148 caused by the first to third line resistances. In one aspect of the present invention, the limiting resistor Rs may have a resistance of about 430Ω to about 760Ω.

According to the principles of the present invention, the voltage charged in the liquid crystal cells of the LCD may be distorted when the gate low voltage VGL is applied to a storage capacitor because the gate low voltage that maintains a voltage charged within the liquid crystal cell becomes unstable.

Accordingly, the limiting resistor Rs may be connected in series at the input terminal of the gate drive signal line group 152 or within the LOG voltage line LOGL, to which the gate low voltage VGL is applied, and cause the first to third line resistances (a, b, c) inherent to the first to third LOG voltage lines LOGL1 to LOGL3 to be negligible. As a result, a difference in gate low voltage VGL applied to each gate driver ICs 148A, 148B and 148C caused by the first to third line resistances (a, b, c) may be prevented. Accordingly, substantially the same gate low voltage VGL may be applied to the plurality of gate lines 156 via each of the gate driver ICs 148A, 148B and 148C and the differences in brightness between the first to third horizontal line blocks (A, B, C) are not generated.

Figure 7A:
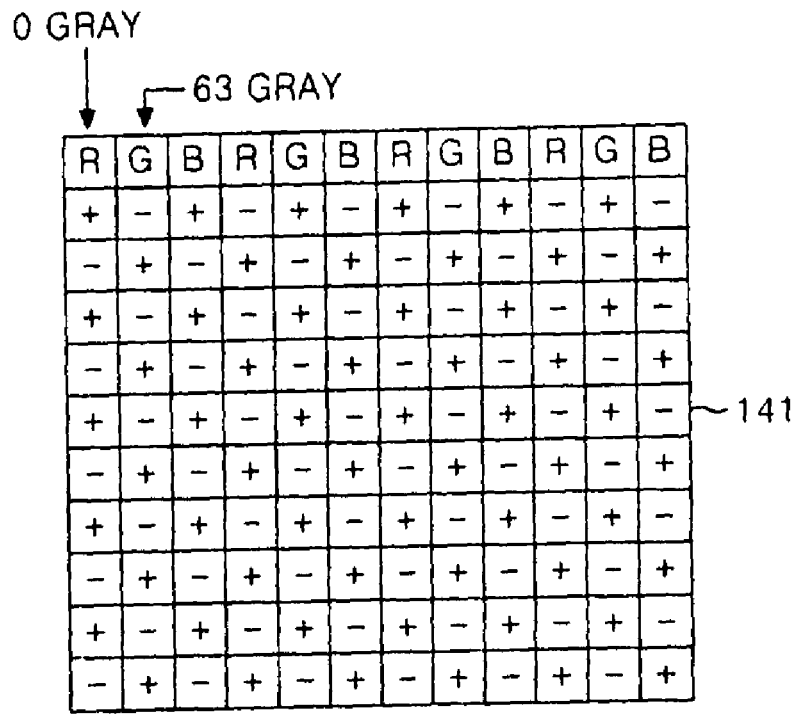
FIGS. 7A and 7B illustrate diagrams of test patterns using a 63 gray scale value and a 0 gray scale value by odd-numbered and even-numbered frames, respectively.
Figure 7B:
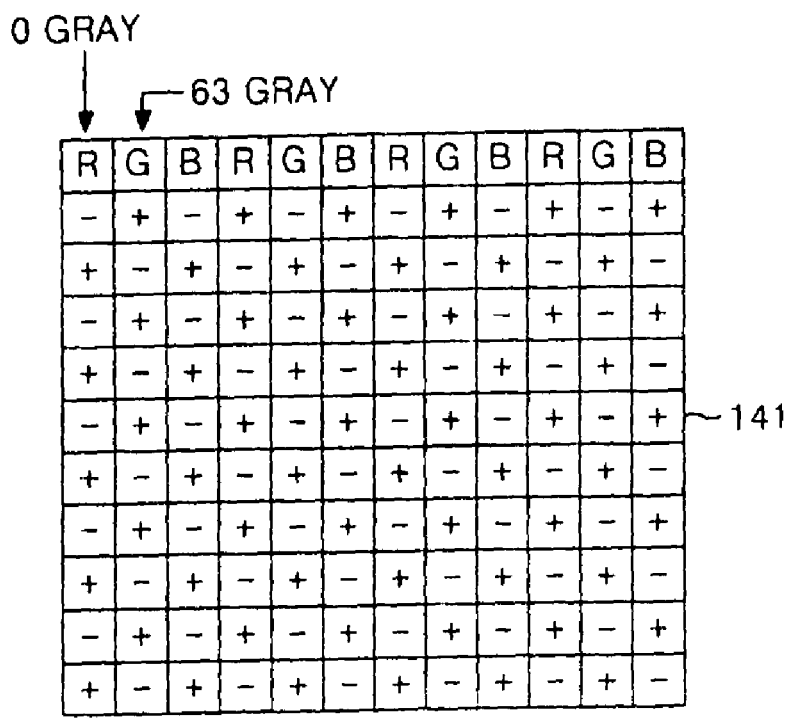

FIGS. 7A and 7B illustrate diagrams of test patterns using a 63 gray scale value and a 0 gray scale value by odd-numbered and even-numbered frames, respectively.

Referring to FIGS. 7A and 7B, the effect of preventing differences in the gate low voltage for each gate driver IC 148 using the aforementioned limiting resistor Rs may be substantial when, for example, liquid crystal cells connected to odd-numbered data lines and even-numbered data lines are supplied with a test pattern including different gray scales from one another while driving the picture display area 141 of the LCD panel according to a dot inversion scheme.

Figure 8:
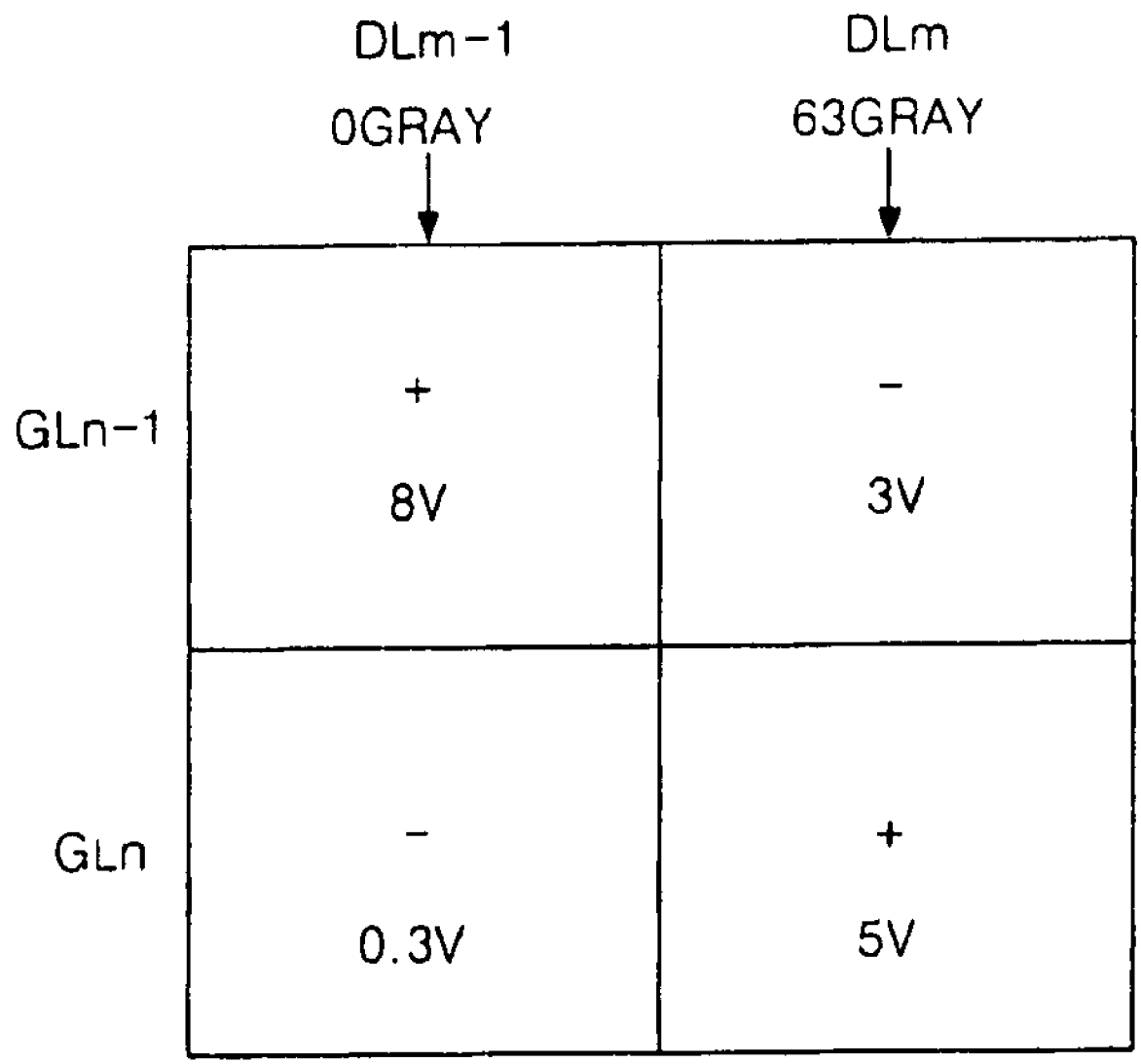
FIG. 8 illustrates a diagram of a data voltage supplied to four adjacent liquid crystal cells.
Figure 9:
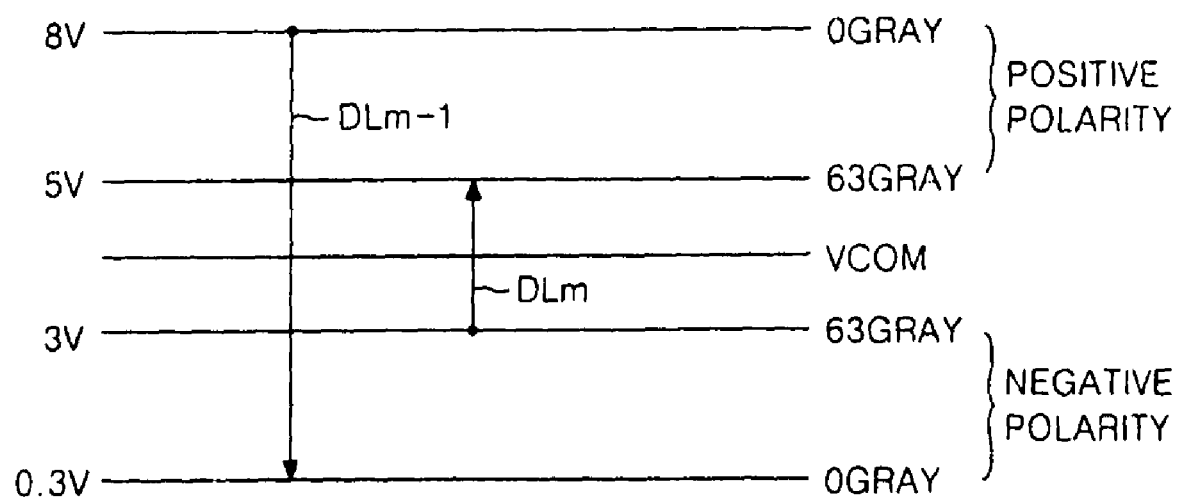
FIG. 9 illustrates a diagram of a change of data voltage applied to the four adjacent liquid crystal cells shown in FIG. 8.

More specifically, and while referring to FIGS. 8 and 9, when a gate high voltage (VGH) signal is applied to the $(n-1)^{th}$ gate line GLn-1, a positive voltage (e.g., about 8V) representing a 0 gray scale value may be applied to the liquid crystal cells (Clc) connected to the $(m-1)^{th}$ data line DLm-1, and a negative voltage (e.g., about 3V) representing a 63 gray scale value may be applied to the liquid crystal cells Clc connected to the $m^{th}$ data line DLm.

Subsequently, a gate low voltage (VGL) signal may be applied to the $(n-1)^{th}$ gate line GLn-1 and the gate high voltage (VGH) signal may be applied to the $n^{th}$ gate line GLn. Accordingly, a negative voltage (e.g., a common voltage reference of about 0.3V) representing a 0 gray scale value may be applied to the liquid crystal cells connected to the $(m-1)^{th}$ data line DLm-1, and a positive voltage (5V) representing a 63 gray scale value may be applied to the liquid crystal cells connected to the $m^{th}$ data line DLm.

Figure 10:
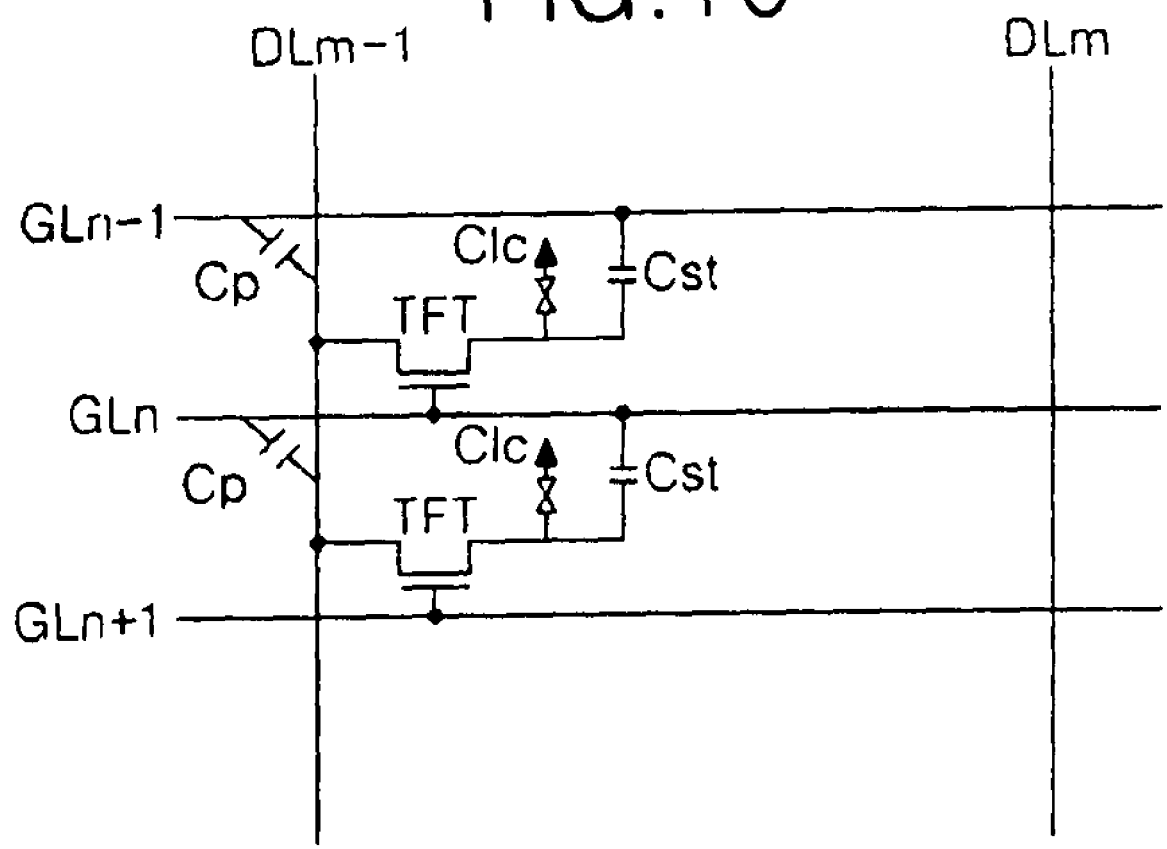
FIG. 10 illustrates an equivalent circuit diagram of a parasitic capacitor between gate lines and data lines.

Accordingly, and referring to FIG. 10, when the gate high voltage VGH is applied to the $n^{th}$ gate line GLn, a difference between the negative voltage applied to the liquid crystal cell connected to the $(m-1)^{th}$ data line DLm-1, representing the 0 gray scale value, and a voltage charged in a parasitic capacitor (Cp) between the pre-stage gate line GLn-1 and the $(m-1)^{th}$ data line DLm-1 causes the gate low voltage VGL applied to the pre-stage gate line GLn-1 to swing from a positive polarity to a negative polarity.

The swing voltages of the first to third gate low voltages VGL1, VGL2 and VGL3 increase proportional to the sum of the first to third line resistances (a, b, c) of the first to third LOG voltage line LOGL1 to LOGL3.

Accordingly, the limiting resistor Rs may restrain such an increase in the swing voltage. Consequently, the limiting resistor Rs, connected in series to the LOG type voltage line LOGL, to which the gate low voltage VGL is applied, may cause the first to third line resistances (a, b, c) inherent to the LOG voltage line LOGL to be negligible. As a result, the swing voltage may be prevented from increasing proportionally to the sum of the first to third line resistances (a, b, c) of the LOG voltage line LOGL. Further, substantially the same gate low voltage VGL may be applied to the gate lines 156 via each of the gate driver ICs 148A to 148C and the difference in brightness between the first to third horizontal line blocks (A, B, C) may be prevented.

Figure 11:
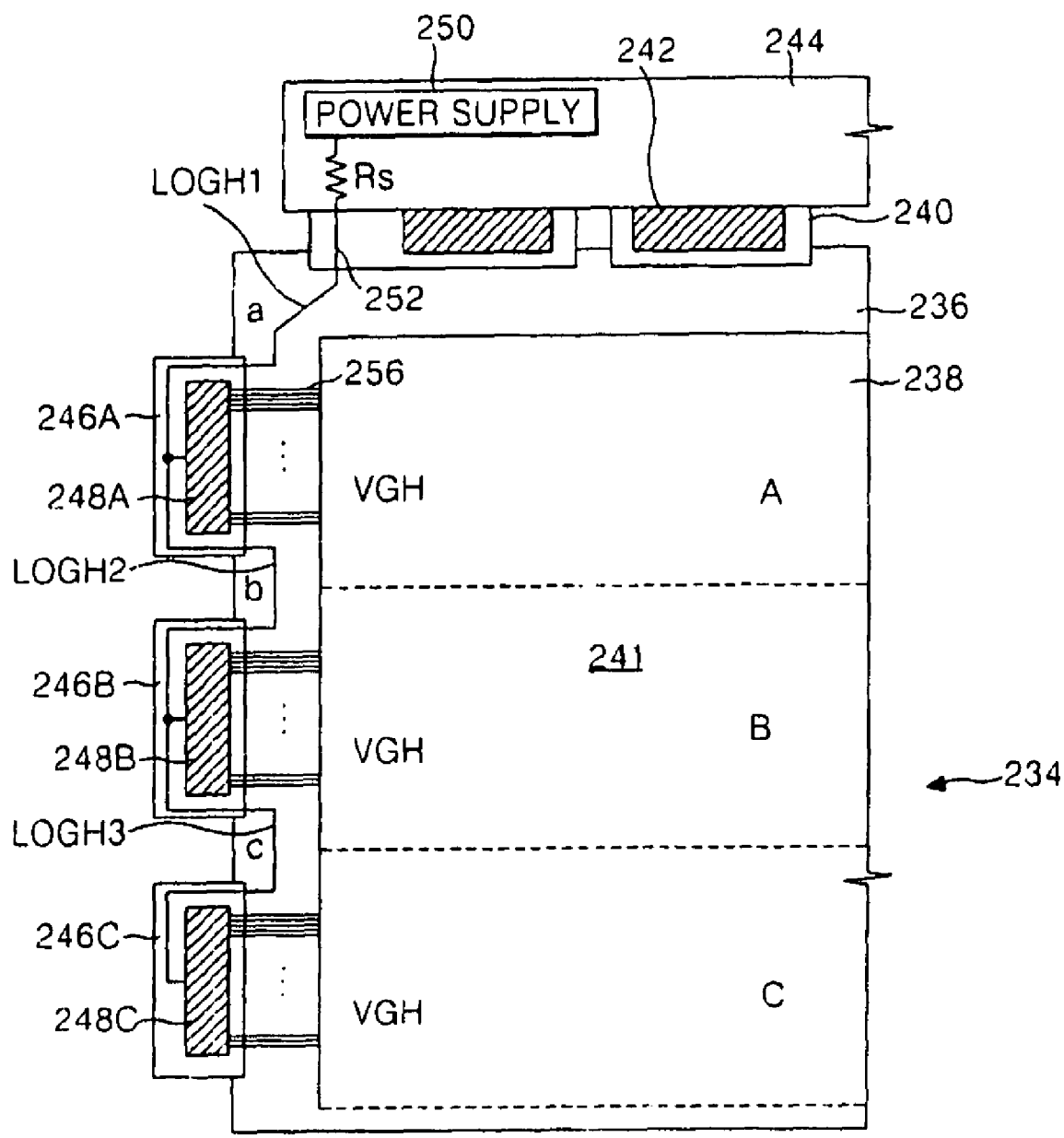
FIG. 11 illustrates a plan view of an LOG LCD according to a third aspect of the present invention.

FIG. 11 illustrates a plan view of an LOG LCD according to a third aspect of the present invention.

Referring to FIG. 11, a liquid crystal display device according to a third aspect of the present invention may, for example, include an LOG signal line group including an LOG voltage line LOGH capable of transmitting a gate high voltage. Further, the LCD according to the fourth aspect of the present invention may include a limiting resistor installed at an input terminal of an LOG voltage line LOGH capable of transmitting a gate high voltage.

The LCD according to the third aspect of the present invention may, for example, include an LCD panel 234; a plurality of data TCPs 240 connected between a first side of the LCD panel 234 and a data PCB 244; first to third gate TCPs 246A to 246C connected to a second side of the LCD panel 234; a plurality of data driver ICs 242 mounted onto respective ones of the data TCPs 240; first to third gate driver ICs 248A to 248C mounted onto respective ones of the gate TCPs 246A to 246C; a power supply 250 for generating drive voltages capable of being applied to the gate driver ICs 248 and the data driver ICs 242, and a limiting resistor Rs connected in series with an output line of the gate high voltage VGH of the power supply 250.

The LCD panel 234 may, for example, include a lower substrate 236 for supporting a thin film transistor (TFT) array and various signal lines such as a plurality of gate lines 256 and a plurality of data lines (not shown); an upper substrate 238 for supporting a color filter array; and liquid crystal between the upper substrate 238 and the lower substrate 236. The LCD panel 234 may further include a plurality of liquid crystal cells defined by crossings of the gate and data lines to collectively form a picture display area 241. In an outer area of the lower substrate 236, located outside of the picture display area 241, an LOG signal line group may be formed for transmitting gate drive signals applied to the first to third gate driver ICs 248A to 248C.

The data driver ICs 242 may be mounted onto respective ones of the data TCPs 240 connected to a data PCB 244 and the lower substrate 236. A first data TCP 240 may further support a gate drive signal line group 252 connected to each of the LOG signal line group on the lower substrate 236. The gate drive signal transmission line group 252 may apply the gate drive signals from the power supply 250 through the data PCB 244 to the LOG signal lines. The data driver ICs 242 may convert digital pixel data signal into analog pixel voltage signals and apply the analog pixel voltage signals to the plurality of data lines in LCD panel 234.

According to the principles of the present invention, the power supply 250 may, for example, generate drive voltages such as a common voltage VCOM, a gate high voltage VGH and a gate low voltage VGL, etc., which are required by the LCD panel.

The first to third gate driver ICs 248 may be mounted onto respective ones of the gate TCPs 246, wherein the gate TCPs 246 may be connected to the lower substrate 236 via output pads connected with the gate driver ICs 248.

The gate driver ICs 248A to 248C may sequentially apply a scan signal, such as a gate high voltage (VGH) signal, to the plurality of gate lines 256 in response to output control signals. Further, the gate driver ICs 248A to 248C may apply the gate low voltage (VGL) signal to the plurality of gate lines 256 during the remainder of a horizontal period, excluding a period during which the VGH signal is applied.

In accordance with the principles of the present invention, the LOG signal line group may, for example, include an LOG voltage line and an LOG control line for applying drive voltages outputted from the power supply 250 (e.g., a high logic voltage of the gate signal (gate high voltage) VGH, a low logic, voltage of the gate signal (gate low voltage) VGL, a common voltage VCOM, a ground voltage GND and a power supply voltage VCC, etc.) and gate control signals outputted from the timing controller (e.g., a gate start pulse GSP, a gate shift clock signal GSC, a gate enable signal GOE, etc.). The LOG signal line group may be formed simultaneously with, and out of the same material as, a gate metal layer forming the plurality of gate lines 256.

In one aspect of the present invention, the LOG signal line group may include an LOG voltage line LOGH capable of transmitting the gate high voltage VGH. Further, a limiting resistor Rs having a relatively high resistance may be provided at the input terminal of the LOG voltage line LOGH to positively influence the picture quality of the LCD. Alternatively, the limiting resistor Rs may be provided at the input terminal of the gate drive signal transmission line group 252 that applies the gate high voltage VGH generated by the power supply 250 to the LOG voltage line LOGH.

Accordingly, the limiting resistor Rs may be connected in series with first to third LOG voltage lines LOGH1 to LOGH3 formed between the gate TCPs 246A, 246B and 246C. Further, the limiting resistor Rs has a relatively high resistance compared to the sum of the first to third line resistances (a+b+c) of the first to third. LOG voltage lines LOGH1 to LOGH3. Therefore, the limiting resistor Rs causes the first to third line resistances (a, b, c) inherent to the LOG signal line group to be negligible and prevents differences in voltage of the gate drive signal from being generated between the gate driver ICs 248 caused by the first to third line resistances. In one aspect of the present invention, the limiting resistor Rs may have a resistance of about 270Ω to about 830Ω.

According to the principles of the present invention, a feed-through voltage Vp of each of the liquid crystal cell of the LCD may be distorted because the voltage charged within the liquid crystal cell may be distorted when the gate high voltage VGH becomes unstable.

Accordingly, the limiting resistor Rs may be arranged in series at the input terminal of the gate drive signal line group 252 or within the LOG voltage line LOGH, to which the gate high voltage VGH is applied, and cause the first to third line resistances (a, b, c) inherent to the first to third LOG voltage lines LOGH1 to LOGH3 to be negligible. As a result, a difference in the gate high voltage VGH applied to each of the gate driver ICs 248A, 248B and 248C caused by the first to third line resistances (a, b, c) may be prevented. Accordingly, substantially the same gate low voltage VGL may be applied to the plurality of gate lines 256 via each of the gate driver ICs 248A, 248B and 248C and the differences in brightness between the first to third horizontal line blocks (A, B, C) are not generated.

Referring to FIGS. 12A and 12B, the effect of preventing differences in the gate high voltage VGH for each gate driver IC 248 using the aforementioned limiting resistor Rs may be substantial when, for example, each of the liquid crystal cells connected to odd-numbered data lines and even-numbered data lines is supplied with a test pattern including substantially identical gray scales while driving the picture display area 241 of the LCD panel according to a dot inversion scheme.

Figure 13:
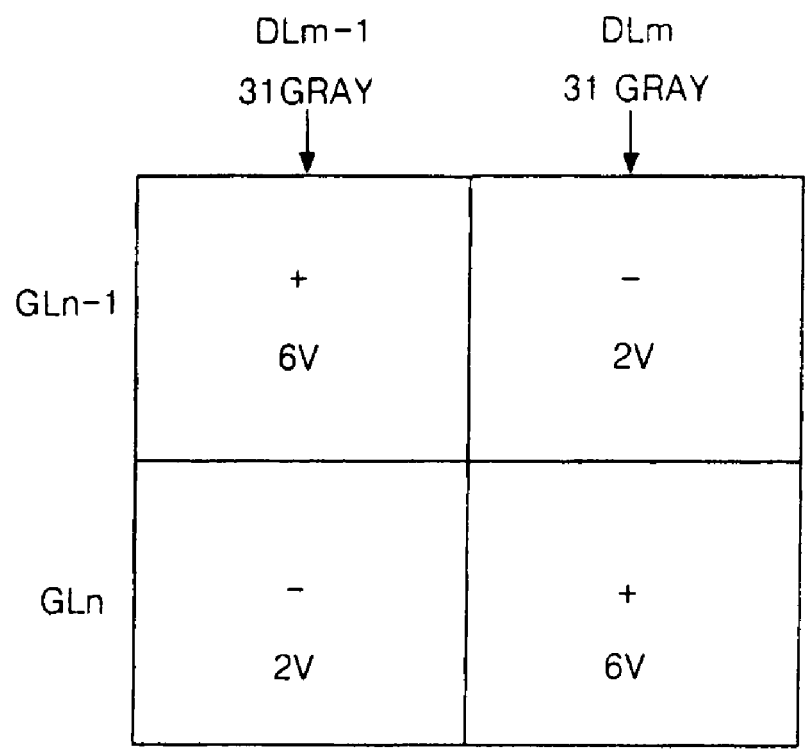
FIG. 13 illustrates a diagram of a data voltage supplied to four adjacent liquid crystal cells.
Figure 14:
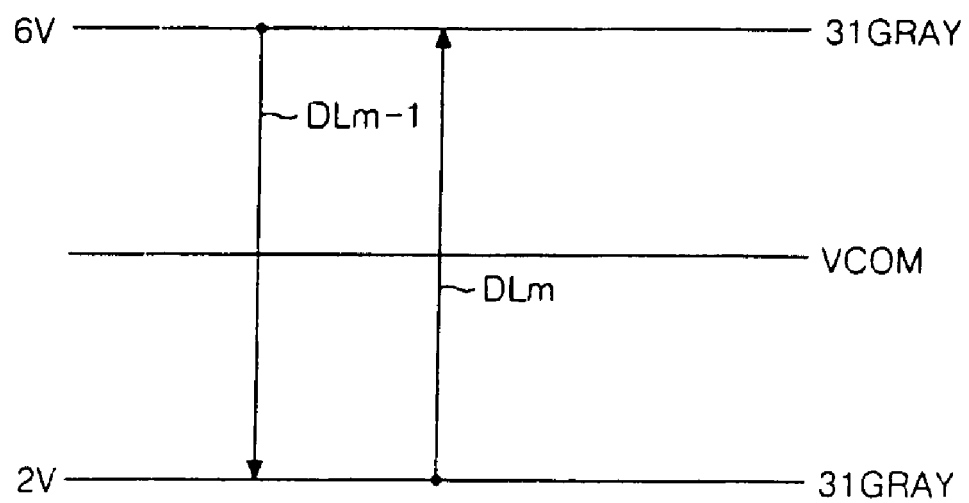
FIG. 14 illustrates a diagram of a change of data voltage applied to the four adjacent liquid crystal cells shown in FIG. 13.

More specifically, and while referring to FIGS. 13 and 14, when a gate high voltage (VGH) signal is applied to the $(n-1)^{th}$ gate line GLn-1, a positive voltage (e.g., about 6V) representing a 31 gray scale value may be applied to the liquid crystal cells (Clc) connected to the $(m-1)^{th}$ data line DLm-1, and a negative voltage (e.g., a common voltage reference of about 2V) also representing a 31 gray scale value may be applied to the liquid crystal cells connected to the $m^{th}$ data line DLm.

Subsequently, a gate low voltage (VGL) signal may be applied to the $(n-1)^{th}$ gate line GLn-1 and the gate high voltage (VGH) signal may be applied to the $n^{th}$ gate line GLn. Accordingly, the negative voltage (e.g., about 2V) representing a 31 gray scale value may be applied to the liquid crystal cells connected to the $(m-1)^{th}$ data line DLm-1, and the positive voltage (e.g., about 6V) representing a 31 gray scale value may be applied to the liquid crystal cells connected to the $m^{th}$ data line DLm.

Accordingly, differences in voltage between the positive voltage and the negative voltages, charged within adjacent liquid crystal cells, are substantially the same. Further, the voltage charged in the liquid crystal cell connected to the pre-stage gate line is prevented from swinging to a value of the voltage charged within the liquid crystal cell of the next-stage gate line. Without the aforementioned limiting resistor, the gate high voltage (VGH) signal applied to the gate lines for each of the gate driver ICs 248 may become unstable by the first to third line resistances (a, b, c) inherent to the first to third LOG voltage line LOGH1 to LOGH3. More specifically, progressing from the first gate driver IC 248A to the third gate driver IC 248C, the line resistances of the LOG voltage line LOGH are added to each other. Accordingly, within the related art LCD, the first gate high voltage VGH1 is greater than the second gate high voltage VGH2 and the second gate high voltage VGH2 is greater than the third gate high voltage VGH3.

Therefore, in accordance with the principles of the present invention, the limiting resistor Rs may be connected in series with the gate drive signal line group 252 or within the LOG voltage line LOGH, to which the gate high voltage is applied, and cause the first to third line resistances (a, b, c) inherent to the LOG voltage line LOGH to be negligible. As a result, since the same gate high voltage VGH is applied to the gate lines 256 via each of the first to third gate driver ICs 248A to 248C, a difference in brightness between the first to third horizontal line blocks (A, B, C) may be prevented.

Figure 15:
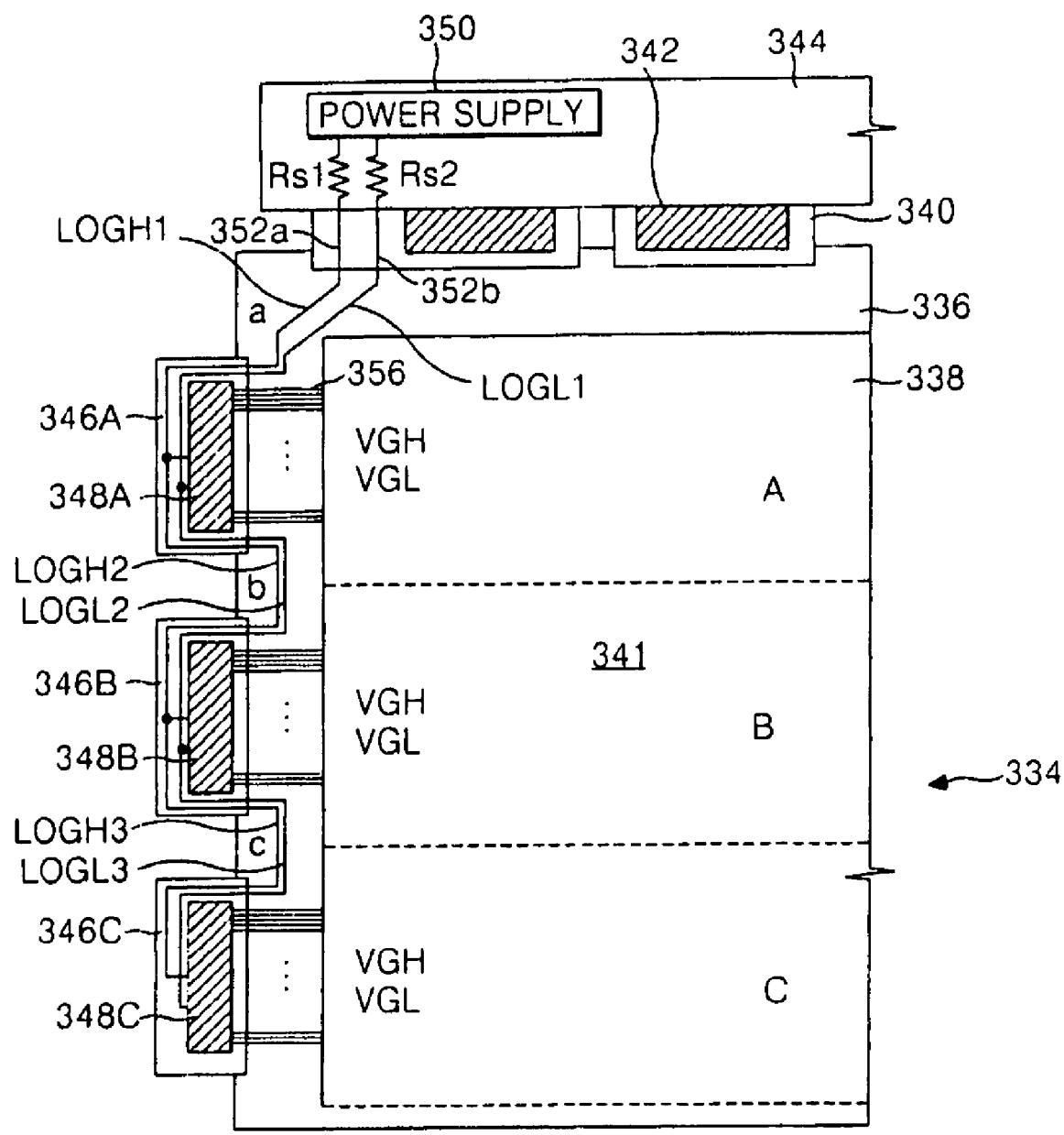
FIG. 15 illustrates a plan view of an LOG LCD according to a fourth aspect of the present invention.

FIG. 15 illustrates a plan view of an LOG LCD according to a fourth aspect of the present invention.

Referring to FIG. 15, a liquid crystal display device according to a fourth aspect of the present invention may, for example, include an LOG signal line group including first and second LOG voltage lines LOGH and LOGL capable of transmitting a gate high voltage and a gate low voltage, respectively. Further, the LCD according to the fourth aspect of the present invention may include first and second limiting resistors installed at input terminals of the first and second LOG voltage lines, respectively.

Referring to FIG. 15, the liquid crystal display device according to the fourth aspect of the present invention may, for example, include a LCD panel 334; a plurality of data TCPs 340 connected between a first side of the LCD panel 334 and a data PCB 344; first to third gate TCPs 346A to 346C connected to a second side of the LCD panel 334; a plurality of data driver ICs 342 mounted onto respective ones of the data TCPs 340; first to third gate driver ICs 348A to 348C mounted onto respective ones of the gate TCPs 346A to 346C; a power supply 350 for generating a plurality of drive voltages capable of being applied to the gate driver ICs 348; and a first limiting resistor Rs1 and a second limiting resistor Rs2 respectively connected in series to an output line of the gate low voltage VGL and to an output line of the gate high voltage VGH of the power supply 350.

The LCD panel 334 may, for example, include a lower substrate 336 for supporting a thin film transistor (TFT) array and various signal lines such as a plurality of gate lines 356 and a plurality of data lines (not shown); an upper substrate 338 for supporting a color filter array; and liquid crystal between the upper substrate 338 and the lower substrate 336. The LCD panel 334 may further include a plurality of liquid crystal cells arranged at crossings of the gate and data lines to collectively form a picture display area 341. In an outer area of the lower substrate 336, located outside of the picture display area 341, an LOG signal line group may be formed for transmitting gate drive signals applied to the first to third gate driver ICs 348A to 348C.

The data driver ICs 342 may be mounted onto respective ones of the data TCPs 340 connected to a data PCB 344 and the lower substrate 336. A first data TCP 340 may further support first and second gate drive signal transmission line groups 352A and 352B, respectively, connected to each of the LOG signal lines LOGH and LOGL, respectively, on the lower substrate 336. The first and second gate drive signal transmission line groups 352A and 352B may apply gate drive signals from the power supply 350 through the data PCB 344 to the LOG signal lines LOGH and LOGL. The data driver ICs 342 may converts digital pixel data signals into analog pixel voltage signals and applies the analog pixel voltage signals to the data lines in LCD panel 334.

According to the principles of the present invention, the power supply 350 may, for example, generate drive voltages such as a common voltage VCOM, a gate high voltage VGH and a gate low voltage VGL, etc., which are required by the LCD panel.

The first to third gate driver IC 348 may be mounted onto respective ones of the gate TCPs 346, wherein the gate TCPs 346 may be connected to the lower substrate 336 via output pads connected with the gate driver ICs 348.

The gate driver ICs 348A to 348C may sequentially apply a scan signal, such as a gate high voltage (VGH) signal, to the plurality of gate lines 356 in response to output control signals. Further, the gate driver ICs 348A to 348C may apply the gate low voltage (VGL) signal to the plurality of gate lines 356 during the remainder of a horizontal period, excluding a period during which the VGH signal is applied.

In accordance with the principles of the present invention, the LOG signal line group may, for example, include of an LOG voltage line and an LOG control line for applying drive voltages outputted from the power supply 350 (e.g., a high logic voltage of the gate signal (gate high voltage) VGH, a low logic voltage of the gate signal (gate low voltage) VGL, a common voltage VCOM, a ground voltage GND and a power supply voltage VCC, etc.) and gate control signals outputted from the timing controller (e.g., a gate start pulse GSP, a gate shift clock signal GSC, a gate enable signal GOE, etc.). The LOG signal line group may be formed simultaneously with, and out of the same material as, a gate metal layer forming the plurality of gate lines 356.

In one aspect of the present invention, the LOG signal line group may include LOG type voltage lines LOGH and LOGL capable of transmitting gate high voltage VGH and the gate low voltage VGL, respectively. Further, first and second limiting resistors Rs1 and Rs2, respectively, having a relatively high resistance may be provided at the input terminals of the LOG voltage lines LOGH and LOGL to positively influence the picture quality of the LCD. Alternatively, the first and second limiting resistors Rs1 and Rs2, respectively, may be provide at the input terminals of the first and second gate drive signal line groups 352A and 352B.

Accordingly, the first and second limiting resistors Rs1 and Rs2 may be connected in series with first to third voltage lines LOGH1 to LOGH3 formed between the gate TCPs 346A, 346B and 346C. Further, the first and second limiting resistors Rs1 and Rs2 may have a relatively high resistance compared to the sum of the first to third line resistances of the LOG type voltage lines LOGH (1-4) and LOGL (1-3). Therefore, the limiting resistor Rs causes the first to third line resistances (a, b, c) inherent to the LOG signal line group to be negligible and prevents differences in voltage of the gate drive signal from being generated between the gate driver ICs 348 caused by the first to third line resistances. In one aspect of the present invention, the first limiting resistor Rs1 may have a resistance of about 270Ω to about 830Ω. In another aspect of the present invention, the second limiting resistor Rs2 may have a resistance of about 430Ω to about 760Ω.

According to the principles of the present invention, the first limiting resistor Rs1 may prevent the gate high voltage (VGH) from becoming unstable so as to prevent the distortion of voltages charged within liquid crystal cells of the LCD caused by a change in the feed-through voltage Vp of the each liquid crystal cell of the LCD. The second limiting resistor Rs2 may prevent the gate low voltage (VGL) from becoming unstable, when the gate low voltage VGL is applied to a storage capacitor capable of maintaining a voltage charged in a liquid crystal cell so that the voltage charged within the liquid crystal cell may be prevented from becoming distorted.

Accordingly, the first limiting resistor Rs1 may be connected in series at the LOG type voltage line LOGH, to which the gate high voltage VGH is applied while the second limiting resistor Rs2 may be connected in series at the LOG type voltage line LOGL, to which the gate low voltage VGL is applied. Wherein both limiting resistors cause the line resistances (a, b, c) inherent to the LOG voltage lines LOGH and LOGL to be negligible. As a result, substantially the same gate high and low voltages VGH and VGL, respectively, may be applied to the plurality of gate lines 356 via each of the gate driver ICs 348A to 348C and the differences in the brightness between the first to third horizontal line blocks (A, B, C) may be prevented.

As described above, and in accordance with the principles of the present invention, a liquid crystal display and a method of driving the same provides a at least one limiting resistor having a relatively higher resistance than the sum of the line resistances of the LOG type signal line group at an input terminal of a particular LOG type signal line. Accordingly, the overall line resistance of the LOG type signal line group may be reduced to the point that it is negligible compared to the resistance of the at least one limiting resistor. Accordingly, the difference in voltage of the gate drive signals applied to the gate driver ICs may be reduced and a difference in brightness between horizontal line blocks, induced by the differences in line resistance, can be prevented.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising:
   a liquid crystal display panel including a transparent substrate;
   first and second tape carrier packages adjacent one side of the transparent substrate;
   first and second gate driver circuits on the first and second tape carrier packages, respectively, for driving the display panel;
   a printed circuit board;
   a signal line for transmitting a drive signal from the printed circuit board to the first and second gate driver circuits, the first gate driver circuit corresponding to a first block of a display area and the second gate driver circuit corresponding to a second block of the display area, the signal line having a segment between the first and second gate driver circuits, the segment being on the transparent substrate and having a predetermined line resistance; and
   at least one current-limiting element located on the signal line before the signal line becomes connected to the first gate driver circuit for limiting a current of the drive signal, wherein a resistance of the at least one current-limiting element is greater than or equal to the predetermined line resistance.

2. A display device, comprising:
   a display panel including a substrate;
   first and second integrated circuits for driving the display panel;
   a printed circuit board;
   at least one signal line for transmitting a drive signal from the printed circuit board to the first and second integrated circuits, the first integrated circuit corresponding to a first block of a display area and the second integrate circuit corresponding to a second block of the display area, the signal line having a portion between the first and second integrated circuits, the portion of the signal line having a predetermined line resistance; and
   at least one current-limiting element located on the signal line for limiting a current of the drive signal, wherein a resistance of the at least one current-limiting element is greater than or equal to the predetermined line resistance.

3. The display device according to claim 2, wherein the substrate is a transparent substrate.

4. The display device according to claim 3, wherein the substrate includes glass or plastic.

5. The display device according to claim 2, wherein the drive signal includes control signals from a timing controller.

6. The display device according to claim 2, wherein the drive signal includes supply voltages from a power supply.

7. The display device according to claim 6, wherein the supply voltages include a gate high voltage and a gate low voltage.

8. The display device according to claim 2, wherein the current-limiting element is located on the printed circuit board.

9. The display device according to claim 2, wherein the current-limiting element is located outside of the printed circuit board.

10. The display device according to claim 2, wherein the resistance of the current-limiting element is substantially equal to a sufficient resistance where an undesirable line between the first block and the second block of the display area is substantially not viewable.

11. The display device according to claim 2, wherein the resistance of the current-limiting element is substantially equal to a resistance where an undesirable line between the first block and the second block of the display area is completely not viewable.

12. The display device according to claim 2, wherein the resistance of the current-limiting element is substantially equal to a resistance for preventing an undesirable line between the first block and the second block of the display area.

13. The display device according to claim 2, further comprising:
    a third integrated circuit connected in series with the first and second integrated circuits, the third integrated circuit corresponding to a third block of the display area,
    wherein the signal line has a second portion between the second and third integrated circuits, the second portion of the signal line having a second predetermined line resistance,
    wherein the at least one current-limiting element is greater than or equal to a sum of the predetermined line resistance of the portion of the signal line between the first and second integrated circuits and the second predetermined line resistance.

14. The display device according to claim 13, wherein the resistance of the current-limiting element is substantially equal to a resistance where a first undesirable line between the first block and the second block of the display area and a second undesirable line between the second block and the third block of the display area are substantially not viewable.

15. The display device according to claim 13, wherein the resistance of the current-limiting element is substantially equal to a resistance where a first undesirable line between first block and the second block of the display area and a second undesirable line between the second block and the third block of the display area are completely not viewable.

16. The display device according to claim 13, further comprising additional integrated circuits as needed according to resolution and size of the display panel, each additional integrated circuit corresponding to a block of the display area.

17. The display device according to claim 2, wherein the first and second integrated circuits are connected in series to each other.

18. The display device according to claim 2, wherein the first and second integrated circuits apply a voltage to the display panel, wherein a value of the voltage applied to the display panel by the first and second integrated circuits is substantially the same.

19. The display device according to claim 2, further comprising a second signal line.

20. The display device according to claim 2, wherein the signal line directly contacts the substrate.

21. The display device according to claim 2, wherein the printed circuit board is spaced apart from the display panel by a tape carrier package.

22. The display device according to claim 21, wherein at least one current-limiting element is arranged on the tape carrier package.

23. The display device according to claim 21, wherein the display panel comprises a first side and a second side, the tape carrier package is coupled to the first side of the display panel; and the first and second integrated circuits are coupled to the second side of the display panel.

24. The display device according to claim 2, further comprising a timing controller for generating the drive signal.

25. The display device according to claim 24, wherein the drive signal comprises timing control signals.

26. The display device according to claim 2, wherein the resistance of the current-limiting element is in a range of about 270Ω to about 830Ω.

27. The display device according to claim 2, wherein the resistance of the current-limiting element is in a range of about 430Ω to about 760Ω.

* * * * *